United States Patent

[11] 3,576,574

[72] Inventors Herbert B. Baskin
Mogegan Lake;
Robert H. Riekert, Ossining, N.Y.

[21] Appl. No. 697,864
[22] Filed Jan. 15, 1968
[45] Patented Apr. 27, 1971
[73] Assignee International Business Machines Corporation
Armonk, N.Y.

[54] LIGHT PEN TRACKING UNIT WITH ALTERNATIVE TRACKING PATTERNS
11 Claims, 10 Drawing Figs.

[52] U.S. Cl. .......... 340/324, 315/18
[51] Int. Cl. .......... G08b 23/00, H01j 29/70
[50] Field of Search .......... 340/324.1, 324.1 (Light Pen Digest); 315/18 (Inquired)

[56] References Cited

UNITED STATES PATENTS

| | | | |
|---|---|---|---|
| 3,089,918 | 5/1963 | Graham | 340/324.1 |
| 3,337,860 | 8/1967 | O'Hara, Jr. | 340/324.1 |
| 3,394,366 | 7/1968 | Dye | 340/324.1 |

*Primary Examiner*—Donald J. Yusko
*Assistant Examiner*—Marshall M. Curtis
*Attorneys*—Hanifin and Jancin and Roy R. Schlemmer, Jr.

ABSTRACT: Apparatus for use in conjunction with a CRT DISPLAY and LIGHT PEN for changing tracking modes when light pen motion is detected. It also relates to such apparatus for dynamically altering the tracking pattern dependent upon the detected speed of light pen travel. That is, the size of the tracking pattern may vary depending on the speed of the light pen.

INVENTORS
HERBERT B. BASKIN
ROBERT H. RIEKERT
BY [signature]
ATTORNEY

| TIMING RING POSITION | INSTRUCTION TO CRT DISPLAY | CORRECTION FACTOR TO ADDER |
|---|---|---|
| 0 | LAS X, Y | -------- |
| 1 | LIS 16, 0 | Y−8 , X−16 |
| 2 | " 0, 16 | X+8 , Y−16 |
| 3 | " -16, 0 | Y+8 |
| 4 | " 0,−16 | X−8 |
| 5 | " −8,−8 | −−− |
| 6 | " 32, 0 | X−16 |
| 7 | " 0, 32 | Y−16 |
| 8 | " −32, 0 | X+16 |
| 9 | " 0,-32 | Y+16 |
| 10 | " −8,−8 | −−− |
| 11 | " 48, 0 | X−24 |
| 12 | " 0, 48 | Y−24 |
| 13 | " −48, 0 | X+24 |
| 14 | " 0,−48 | Y+24 |
| 15 | " −8,−8 | −−− |
| 16 | " 64, 0 | X−32 |
| 17 | " 0, 64 | Y−32 |
| 18 | " -64, 0 | X+32 |
| 19 | " 0,-64 | Y−32 |

GATING FOR X ORIGIN REGISTER

FIG.7 TIMING RING

X ORIGIN ADDRESS REGISTER

TIMING CHART

LIGHT PEN TRACKING UNIT WITH ALTERNATIVE TRACKING PATTERNS

BACKGROUND OF THE INVENTION

As the use of electronic computers becomes more and more diversified, there is a continuing need for different input/output devices to feed information to a computer based upon the needs of many different types of users. In recent years the use of a cathode-ray-type display with a light pen attachment has received great attention due to the ability to input graphic-type information directly into a computing system. Generally, a desired pattern is traced on the face of the CRT DISPLAY with a light pen and the path of the pen is detected and sent through the computer for whatever computational operations which may be desired. It is of course necessary that the path or movement of the light pen across the face of the CRT tube be detected and the appropriate information in the terms of X and Y coordinates transmitted to the utilization computer.

Prior art system for tracking light pen movement in the past have been very complex and have required expensive timing, detection, and coincidence circuitry. In a typical prior art system a series of horizontal closely spaced lines is displayed upon the face of the CRT tube and when the pen intersects one of these lines, the timing controls determine the particular line detected as well as the point along said line where said detection was made. In the majority of these tracking systems the tracking patterns remain essentially stationary and the tracking information is computed in the above manner. Other tracking systems utilizing a single or fixed concentric box or circle pattern have been proposed. However, in all such known cases the pattern is static, i.e., does not change upon various conditions of tracking encountered. Stated differently, the same tracking pattern is used at all times. As stated previously, with such systems, extremely precise circuitry must be utilized to obtain reasonable tracking accuracy and also a good deal of computational time of the computer is required to produce and completely evaluate the tracking information. Such prior art systems have severely limited the usefulness of such light-pen-type I/O devices in the past.

SUMMARY AND OBJECTS

It has now been found that a considerably simplified light pen tracking system is attainable by utilizing a tracking pattern which is dynamically variable depending upon the speed of light pen motion which is detected. Assuming that the light pen is active, the system will operate in a fixed mode as long as there is no motion of the light pen and will switch to a second mode of operation when motion of the light pen is detected. Further, only so much of the tracking pattern will be presented as is necessary to obtain a light pen detect signal at which point the location of the detect is calculated and a new tracking pattern initiated. Thus, even in the active mode, the pattern will "grow" with increased speed of the light pen.

By utilizing these concepts the system is active to produce the high-speed light tracking mode only when needed and at other times is in a relatively quiescent state and produces only the no detection mode tracking pattern.

It is accordingly a primary object of the present invention to provide a light pen tracking system wherein the tracking pattern is dynamically variable depending upon the speed of light pen travel which is detected.

It is a further object of the invention to provide such a system wherein computational overhead is kept to a minimum during periods of little or no light pen movement.

It is yet another object of the invention to provide such a system wherein the tracking pattern grows outward only until the detect is encountered at which point a new tracking pattern may be initiated.

It is a still further object to provide such a system wherein a high degree of tracking accuracy is possible with a minimum complexity of timing and tracking circuitry.

The foregoing and other objects, features and advantages of the invention will be apparent from the following more particular description of preferred embodiments of the invention, as illustrated in the accompanying drawings.

DESCRIPTION OF DISCLOSED EMBODIMENTS

Figure 1:
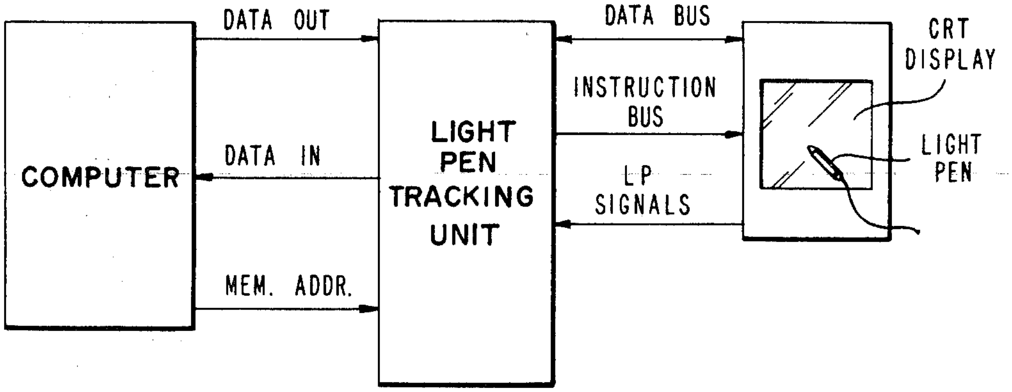
FIG. 1 is an organizational block diagram generally illustrating the present light pen tracking unit with a general purpose computer and a CRT DISPLAY UNIT.

The objects of the present invention are accomplished in general by a light pen tracking system for use with a conventional cathode ray tube display unit equipped with a light pen. When the light pen switch is activated, it indicates to the system that a light pen tracking mode of operation is desired. The system includes means for presenting a first tracking pattern on the CRT DISPLAY when no light pen motion is present and for presenting a second tracking pattern when there is light pen motion. The first tracking pattern is considerably smaller than the second and requires less machine overhead for generating same. In the presently disclosed embodiment the first tracking pattern comprises a single box or polygon while the second pattern comprises a plurality of concentric boxes or polygons including said first box. When a light pen detect occurs, the system will automatically change into the second tracking pattern or mode of operation and upon such detect the tracking pattern origin will be caused to move towards the point where the detect occurred thus following the light pen motion across the face of the CRT DISPLAY. The exact manner in which this movement of the tracking patterns is accomplished will be set forth more fully subsequently. If the entire second tracking pattern is generated without a light pen detect, the system assumes that the light pen is within the inner polygon of the pattern and changes the tracking pattern to the smaller or first mode. The first mode tracking pattern will be repeated until another light pen detect occurs. It will of course be noted that there is a limit to the rate of light pen movement which this or any tracking system can follow and it is possible for the light pen to completely escape the pattern. However, in this situation the operator will see that his pen is outside of the generated pattern and will have to initiate a procedure for relocating the pen within the tracking pattern and proceed more slowly.

The present embodiment is disclosed as being connected to an IBM 2250 display unit and also an IBM 1130 computer. However, the present tracking system to which the present invention is directed with suitably modified timing controls and other interface modifications which could be made by one skilled in the art, could be adapted to be connected to any CRT DISPLAY UNIT similar to the IBM 2250 and also provided with a light pen. Basically, the 2250 display unit operates on the basis of incremental electron beam displacement as opposed to the development of the picture or lines by means of a TV tape raster scan wherein the complete scanning of the CRT takes place with appropriate unblanking of the CRT beam where it is desired to develop a line or other image. It should be noted, however, that with suitable modification some of the broader aspects of the present invention would be equally applicable to the latter type of CRT DISPLAY. However, it is believed to offer the greatest benefits in an incremental beam displacement type of environment.

The function of the computer is primarily for the storage and accessing of the X, Y coordinates of the beam location as well as for the overall control of the system. For example, the ORIGIN ADDRESS where the tracking pattern is to be started in each instance would normally be accessed from the computer memory and as the light pen is tracked, each time the tracking pattern moves to a new location, this new location address must be stored back in memory in order to keep a sequential list of the light pen motion which is the primary function of the tracking system, i.e., to subsequently reproduce on the display the pattern just traced and also for the purpose of making possible various calculations based upon the coordinates of said traced pattern. However, this is well known in the art and will not be further elaborated at this point.

The present light pen tracking system will now be more specifically described with reference to the drawings. FIG. 1 is a very general block diagram illustrating the LIGHT PEN TRACKING UNIT located between a general purpose computer (i.e., an IBM 1130) and a CRT DISPLAY (i.e., an IBM 2250) provided with a light pen. The various bus lines between the units are clearly labeled and it is believed that their function should be well known to one skilled in the art. Essentially, the LIGHT PEN TRACKING UNIT is a standalone device which upon activation of the light pen switch, which indicates to the system that the operator is about to use the light pen, substitutes its own stored incremental display list for various lists of stored patterns stored in the computer which normally produce the CRT pattern. Further, it generates a new list of addresses based upon light pen detection which will be subsequently transmitted to the computer and stored in an appropriate storage location to provide a new list for the particular pattern being traced upon the CRT DISPLAY.

Figure 2:
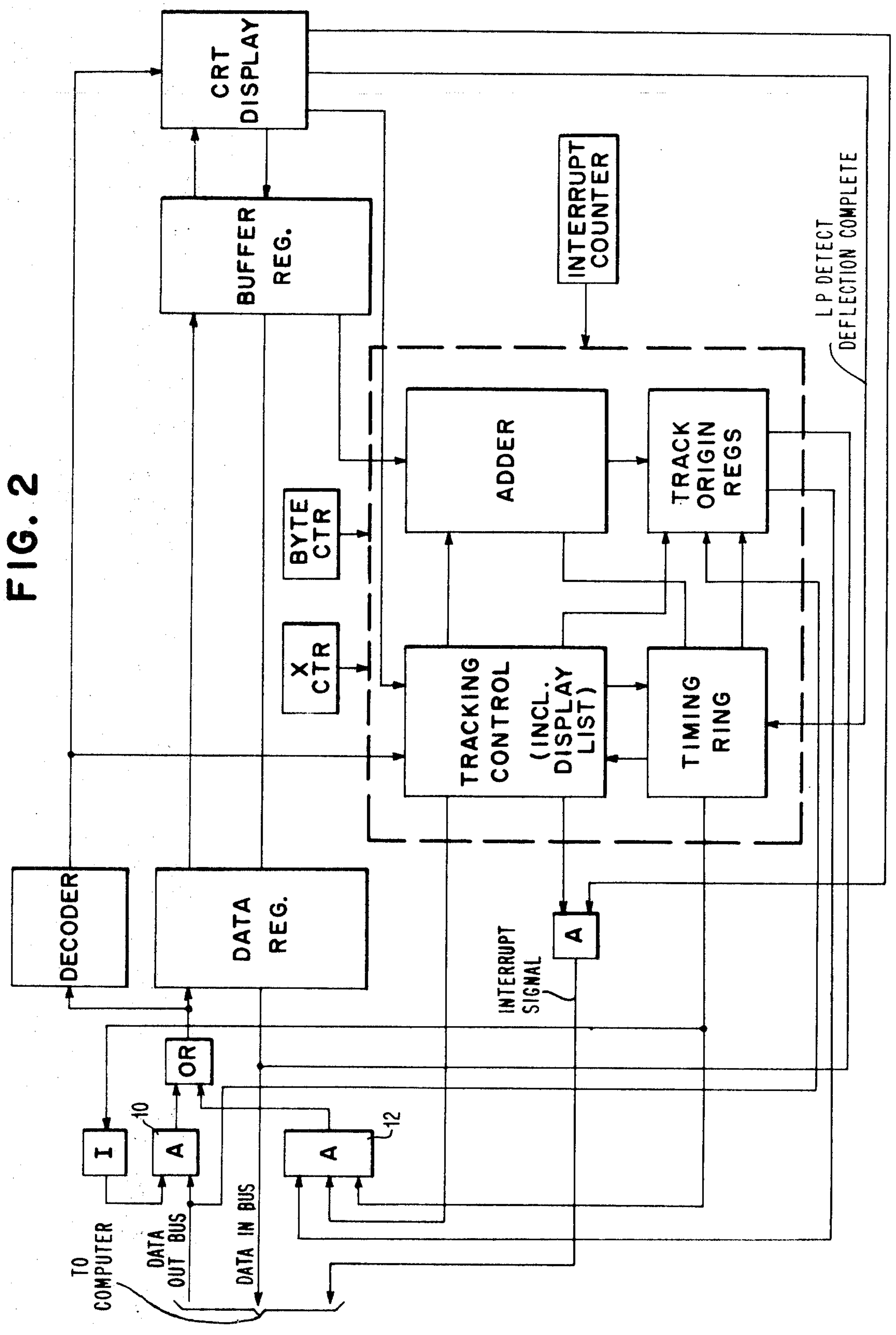
FIG. 2 comprises an organizational functional block diagram of the present light pen tracking unit showing the CRT DISPLAY UNIT.

FIG. 2 is a functional block diagram showing more detail of the LIGHT PEN TRACKING UNIT and the CRT DISPLAY UNIT as shown in FIG. 1. The box within the dotted line comprises that portion of the hardware which is specific to the present tracking system. The other hardware would be normally found in any interface unit located between a CRT DISPLAY UNIT and a relatively standard computer, i.e., the DATA REGISTER, BUFFER REGISTER and DECODER are relatively common interface devices employed between an I/O unit and a computer. The X-COUNTER, the BYTE COUNTER, and the INTERRUPT COUNTER are similarly relatively common timing clocks used in such interface devices for the purpose of gating data and instructions between a computer and its associated I/O devices. These existing counters are utilized for convenience in the present tracking control unit as a suitable source of timing pulses. Their relative timing is clearly shown in FIG. 10 especially as they apply to the timing sequences of the TIMING RING of the present tracking control unit. The block marked TRACKING CONTROL initiates the present system and is activated primarily by the light pen active switch which would normally be located in the CRT DISPLAY and would either be thrown manually by the operator or would be actuated by the pressing of the light pen against the face of the CRT device. This TRACKING CONTROL BLOCK also may be considered to contain the address increments or lists for the various tracking patterns of the present system, said increments being illustrated in FIG. 5.

The block marked ADDER performs the function of updating the tracking pattern ORIGIN ADDRESS in accordance with a correction fed from the TRACKING CONTROL BLOCK under control of the output of the TIMING RING. The particular correction will be chosen depending upon what portion or line segment of the tracking pattern was detected by the light pen. The tracking origin registers include both an X-and a Y-holding register, the X-REGISTER being illustrated in FIG. 9. Each register contains the coordinates of the current origin of the tracking pattern (X and Y). This register is updated whenever the tracking pattern is caused to move and may be utilized to gate the new origin either to the CRT DISPLAY or back to the computer for compiling a display list for later presentation.

The block marked TIMING RING is the basic timing device for the present tracking pattern generation system and basically controls the generation of the various segments of the tracking pattern and also indicates during which segment a light pen detect occurred and initiates appropriate activities in the remainder of the system to update the origin address and appropriately move the tracking pattern for the next generation cycle. The gate circuits 10 and 12 merely gate the appropriate address data into the DATA REGISTER for subsequent transmission to the CRT DISPLAY for presentation.

Figure 3:
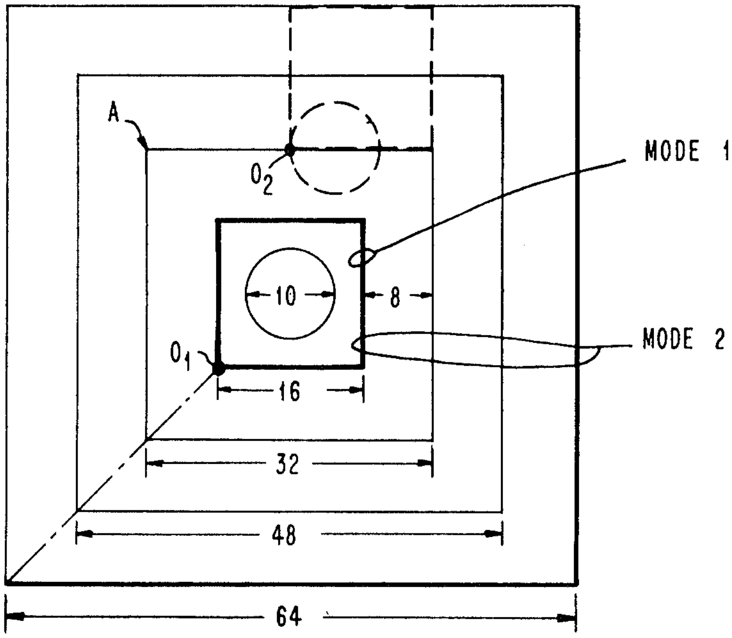
FIG. 3 comprises a graphical representation of the tracking pattern generated by the disclosed embodiment.

FIG. 3 is a graphical representation of a simplified tracking pattern as anticipated by the present invention. The inner box alone constitutes the pattern which would be presented during operation under MODE 1. All four boxes would be presented during operation under MODE 2. It should however be understood that the use of squares is intended as being exemplary only and that any more complex polygon could be substituted for the squares with consequent improved resolution of the tracking with however increased complexity of the tracking control circuitry. The circle in the center of the pattern marked light pen indicates the actual relative size of the light pen with respect to the tracking patterns. The numbers 10, 16, 32, 48 and 64 illustrate the relative size in raster units of the various sides of the tracking patterns as well as the diameter of the light pen. It will also be noted that each of the squares or boxes are eight raster units apart thus it is not possible for the light pen to ever be so situated between any of the concentric boxes that it would not be detected.

The point marked $0_1$ in the lower left-hand corner of the inner box indicates the ORIGIN ADDRESS at which the tracking pattern originates. During MODE 1 operation the tracking pattern would be cyclically repeated beginning at this point assuming no detect occurred. Assuming either original startup of the tracking system or a light pen detect, the origin for the larger tracking pattern would similarly begin at this point $0_1$. However, assuming that a detect occurred as indicated by the dotted circle representing the light pen appearing along the top line of the second box from the inside, the tracking pattern would be caused to move 16 raster units (in the X-direction) from the point A. Thus, the new tracking pattern would begin at the point designated $0_2$. The inner box of this new tracking pattern is similarly shown in dotted lines. This new origin $0_2$ is arrived at by taking the quantity X=+16 which is gated out of the correction factor portion of the INSTRUCTION LIST shown in FIG. 5 during the TIMING RING POSITION 8 and adding this to the X and Y coordinates of the point A which is the terminal point of the last tracking pattern segment generated.

Figures 4, 5:
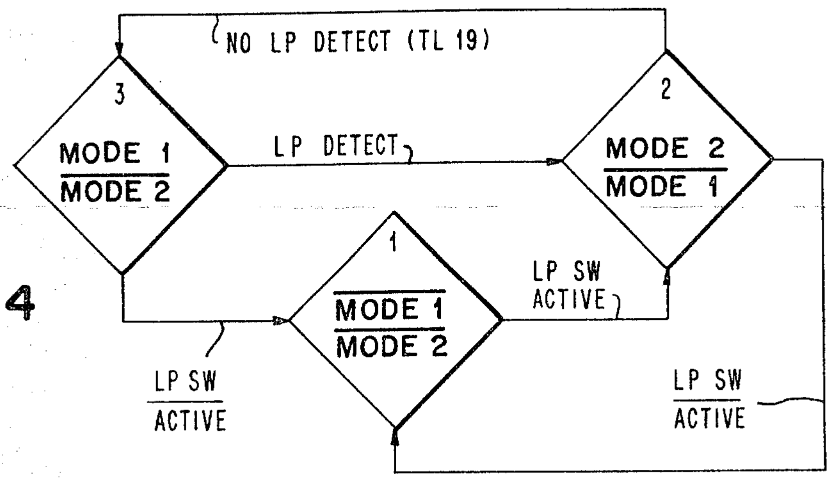
FIG. 4 comprises a simplified flow chart for the tracking mode controls of the present invention.
FIG. 5 is a table illustrating the address increments utilized during various stages of the TRACKING UNIT TIMING RING to generate the various strokes of the tracking pattern and also to update the pattern location after a light pen detect.

FIG. 4 represents a very simplified flow diagram of the operation of the present system illustrating the major events which can take place relative to activation of the system and switching from MODE 1 to MODE 2 and back. Assume first that the system is quiescent or in BLOCK 1 wherein neither MODE 1 nor MODE 2 are active. If a LIGHT PEN SWITCH ACTIVE signal is received (LPSW Active and STM) the system will switch to BLOCK 2 wherein MODE 2 becomes inactive. The STM pulse is merely a start pulse derived from the master system timing clock which assures that the present tracking pattern generation system is properly timed with respect to the rest of the system. As long as subsequent light pen detects are received on each cycle, the system remains operating in Mode 2 and attempts to generate the large tracking pattern. However, if the entire tracking pattern is generated, i.e., the line indicated NO LIGHT PEN DETECT (TL19) becomes active. The system must assume that the light pen is stationary within the inner box thus causing the system to move to BLOCK 3 wherein MODE 1 is active. The system will continue to operate in this mode until either another LIGHT PEN DETECT occurs which will again switch the system to BLOCK 2 or until the light pen switch becomes inactive, i.e., $\overline{\text{LPSW ACTIVE}}$. It may thus be seen that the system will automatically switch from MODE 1 to MODE 2 when required and then switch back into MODE 1 when appropriate.

FIG. 5, as indicated previously, constitutes the list of incremental addresses and correction factors which are stored at an appropriate location in the system for the purpose of 1) generating the tracking pattern on the face of the CRT DISPLAY and 2) generating a new ORIGIN ADDRESS when a light pen detect occurs on one of the lines of the tracking pattern. Column 1 indicates the TIMING RING POSITION which causes the various events to occur. Column 2 is a list of the actual address increments supplied to the CRT DISPLAY which are used to update the absolute address register in the CRT DISPLAY when a new incremental stroke is to be made. Column 3 is the list of actual correction magnitudes which will be supplied to the ADDER and used to modify the then current address in the DISPLAY UNIT when a particular detection occurs on one of the segments of the tracking pattern.

Figure 6:
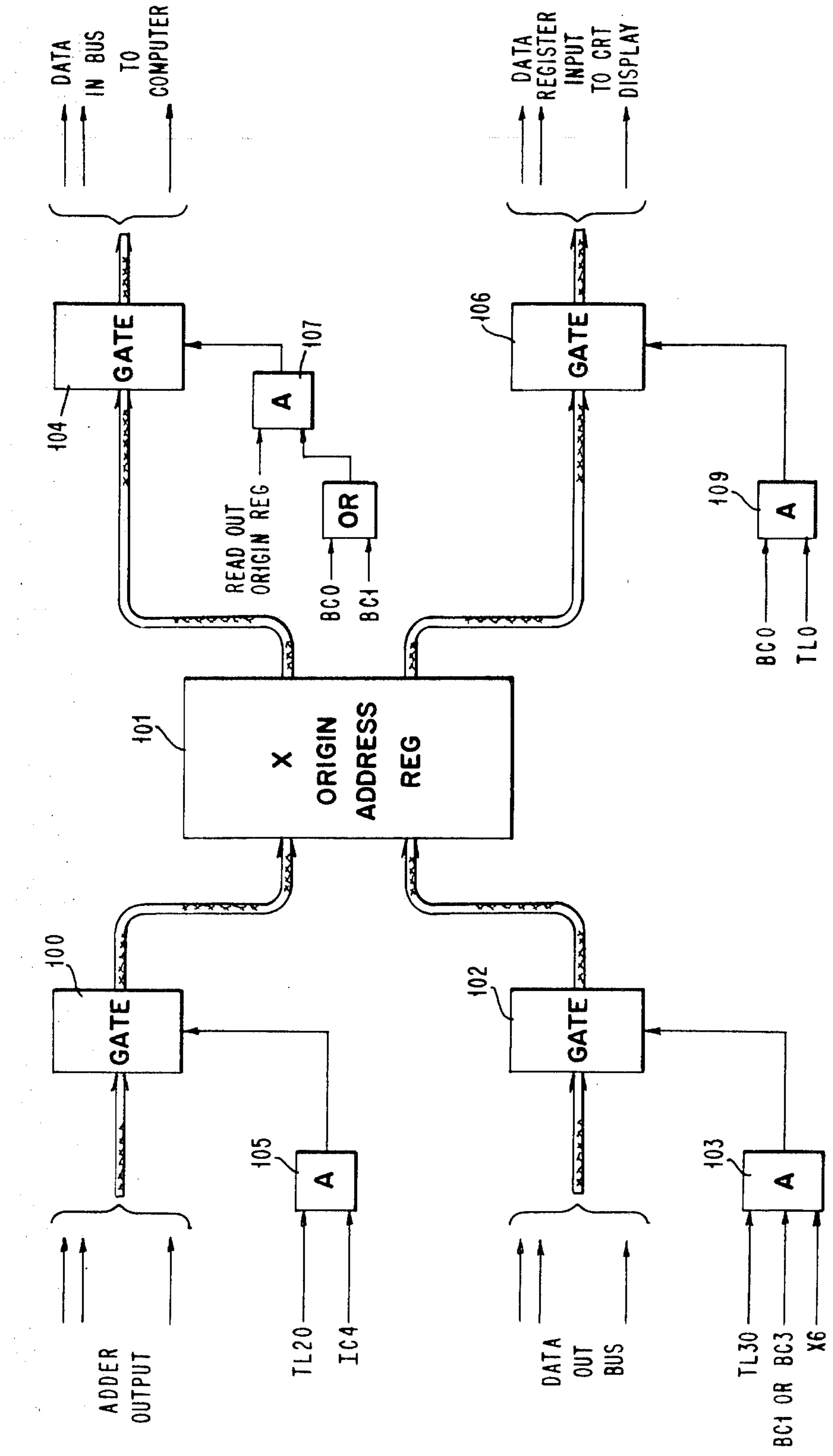
FIG. 6 comprises a simplified functional block diagram illustrating the operation of the X ORIGIN ADDRESS REGISTER and the controls therefor.

FIG. 6 is a simplified block diagram illustrating the basic functions of the X ORIGIN ADDRESS REGISTER controls. A similar register would be utilized for the Y ORIGIN ADDRESS and since it would be essentially identical, it is not shown here. It will be noted that the REGISTER 101 may be loaded from either the ADDER OUTPUT or from the DATA OUT BUS from the computer. In the latter case this is done through GATE 102 under control of TIMING LATCH TL—30 and X CLOCK pulse, X6, which actuates AND gate 103 and thus the GATE 102. The output from the ADDER may be gated into this register under control of AND gate 105 which is activated by the TIMING LATCH 20 output and the occurrence of INTERRUPT COUNTER PULSE IC–4. The REGISTER 101 is loaded from the computer upon initiation of the tracking pattern sequence and comprises the complete X origin coordinate at which the tracking pattern is to be initiated, i.e. $0_1$ on FIG. 3. This absolute address is updated or rather regenerated after a light pen detect. The complete updated address is the output of the ADDER in FIG. 2 wherein the current address in the CRT DISPLAY BUFFER REGISTERS constituting the address of the last completed stroke is modified by the instruction list shown in FIG. 5. When a new tracking pattern is to be initiated, i.e., upon the occurrence of TIMING RING OUTPUT TL–0, GATE 106 is energized thus gating the new ORIGIN ADDRESS to the CRT DISPLAY. The address may also be read out upon command to the DATA IN BUS to the computer upon appropriate signalling by the operator as indicated by READOUT ORIGIN REGISTER through AND gate 107.

Figure 7:
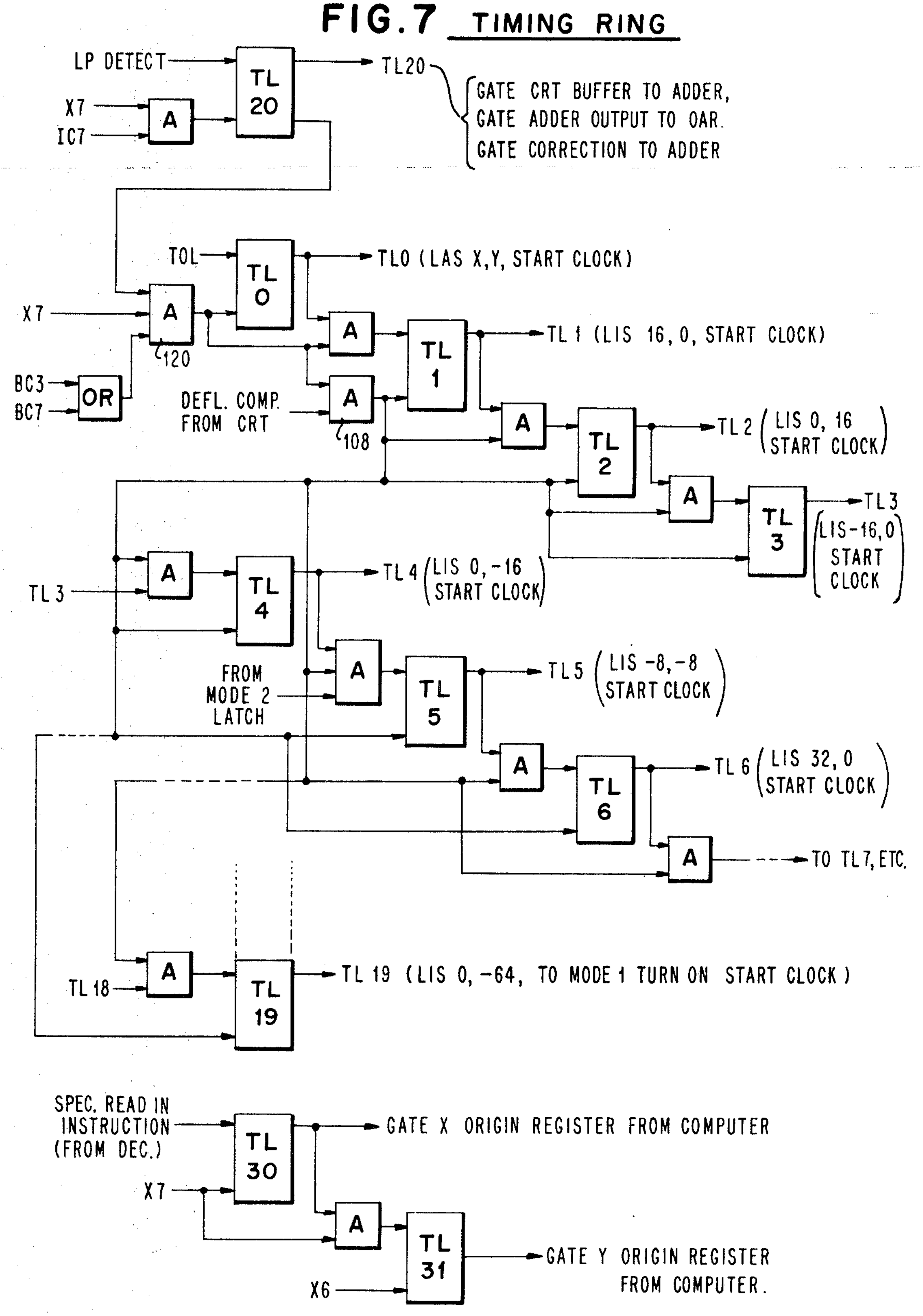
FIG. 7 is a logical block diagram of the TIMING RING which produces the control pulses TL0—TL31.

FIG. 7 is a logical schematic diagram of the TIMING RING shown in FIG. 2. Each of the blocks marked TL0 through TL31 are flip-flops having a set and reset state and are well known in the art. For example, if the upper input TL–1 comes up, its output stays up until the lower input resets said flip-flop. This holds true for all of the latches in the TIMING RING. TIMING LATCHES TL0 through TL19 perform the function of generating the actual tracking pattern on the CRT DISPLAY. The text material opposite output TL0, the parenthetical expression (LAS X, Y) indicates the LONG ABSOLUTE Stroke which causes the trace to go to the original origin on the face of the CRT DISPLAY specified by the programmer. The parenthetical expressions opposite the other outputs TL1—TL19 indicate the incremental strokes supplied from the list instructions shown in FIG. 5 which cause successive sides of the tracking pattern to be generated. It will be noted that TIMING LATCHES TL7—TL18 are not shown as the circuitry is a mere duplication of TL5 and TL6. TIMING LATCH TL20 performs the function of generating a new origin and updating the ORIGIN ADDRESS REGISTERS, i.e., see FIGS. 6 and 9 from the output of the ADDER after a light pen detect. This may be seen from the TL20 input on FIG. 9. TIMING LATCHES TL30 and TL31 are operable under control of the programmer to initiate "reading in" of the original ORIGIN ADDRESS from the computer. TL31 turns on as TL30 turns off as the addresses must be gated over the same bus and these latches provide the necessary timing required.

Figure 8:
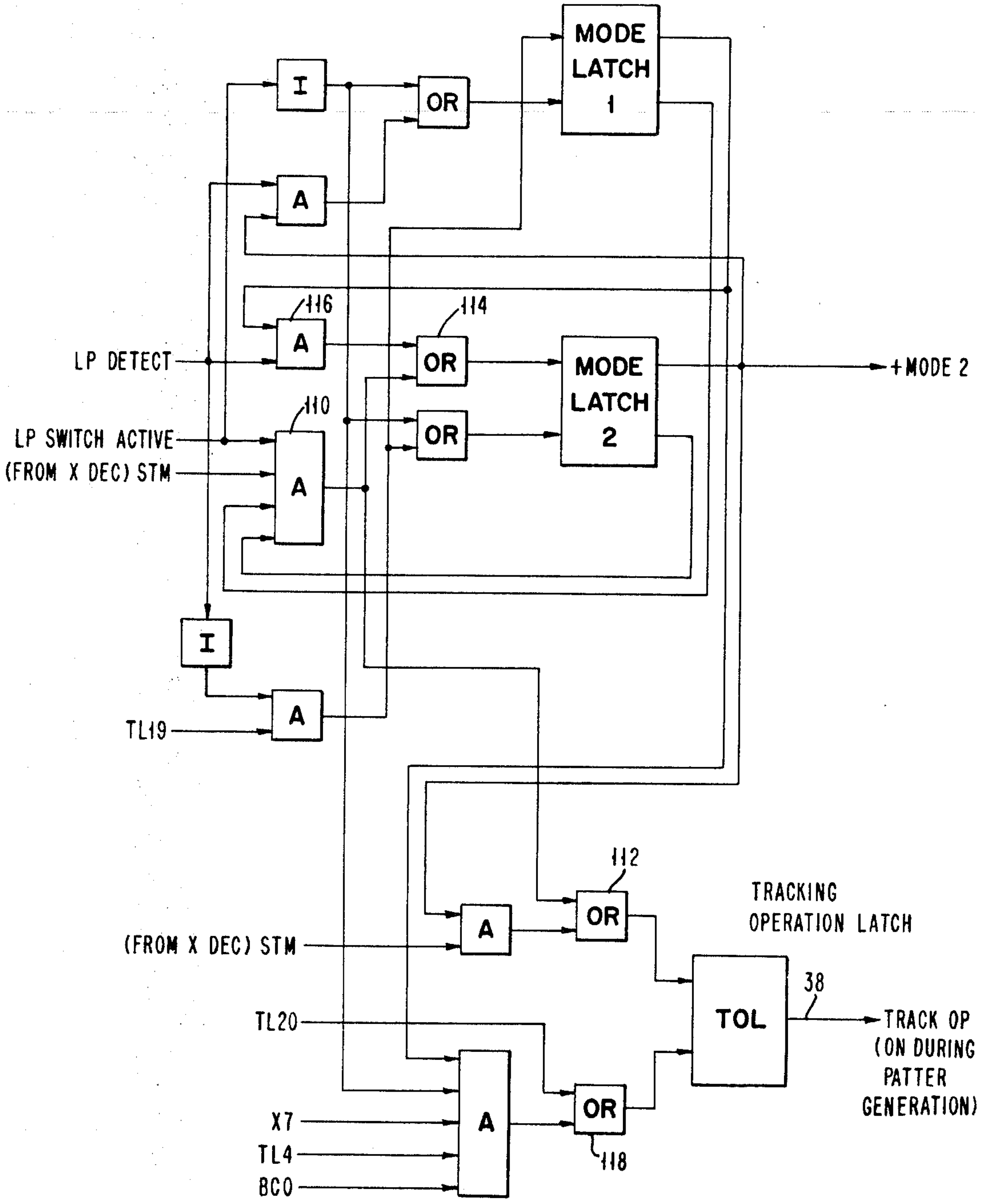
FIG. 8 comprises a logical block diagram of the TRACKING MODE CONTROLS and TRACKING OPERATION LATCH.

Referring to TL0, it will be noted that this latch is turned on by the turn-on of the TRACKING OPERATION LATCH TOL on FIG. 8 which initiates the generation of the tracking pattern. The turn-on of TL0 causes the CRT beam to come to the origin specified by the programmer where the tracking pattern is to begin. Its turnoff is accomplished by the simultaneous occurrence of NO LIGHT PEN DETECT thus leaving TL20 in its unset state, the occurrence of timing pulse X7 and either BC3 or BC7. The occurrence of these latter pulses are shown in the timing chart of FIG. 10 and essentially allow sufficient time for the generation of the LONG ABSOLUTE STROKE. It will be noted in referring to AND circuit 108 that the DEFLECTION COMPLETE SIGNAL from the CRT DISPLAY is ANDed with the above pulses and is utilized to reset TIMING LATCHES TL1—TL19. Thus, as each of the TIMING LATCHES TL1—TL19 is first initiated, it is reset by the simultaneous occurrence of NO LIGHT PEN DETECT, pulse X7, pulse BC3 or BC7 and DEFLECTION COMPLETE SIGNAL which resets the various latches and in effect turn on the next latch until either TL19 occurs or a light pen detect occurs at which point the INTERRUPT COUNTER is initiated and an ORIGIN ADDRESS update operation occurs. This update operation is, as stated previously, initiated by the turning on of latch TL20 which inhibits any further advancement of the TIMING RING, causes the appropriate correction to be gated from the CORRECTION FACTOR LIST as illustrated in FIG. 5 to the ADDER together with the current contents of the CRT DISPLAY BUFFER REGISTER. It also enables the gating to allow the Adder output to be gated into both the X and Y ORIGIN ADDRESS REGISTERS (see FIG. 6 and FIG. 9).

Referring now to FIG. 8, the two MODE LATCHES (1 and 2) and the TRACKING OPERATION LATCH (TOL) are shown. The latter latch is the primary control element which initiates the actual tracking pattern generation upon the occurrence of a light pen active signal. It will be noted on FIG. 8 that this signal is applied to the AND gate 110. The other inputs are the STM pulse which, as stated previously, is derived from the basic system clock and the simultaneous setting of MODE LATCH 1 and MODE LATCH 2 in their off position. The output of AND 110 passes through OR gate 112 to set the TRACKING OPERATION LATCH. It will be noted that the output from AND gate 110 also goes through OR gate 114 to initially set MODE LATCH 2 to its active state. As stated previously, upon initiation of the system, MODE 2 OPERATION is entered initially as it is assumed that in the majority of instances the light pen will be moving and this will allow the tracking pattern to surround the pen in motion whereas the MODE 1 pattern might be escaped by the pen if its rate of travel were sufficiently rapid. It will also be noted that the occurrence of a light pen detect together with the setting of the MODE LATCH 1 to its "on" position will result in an input to AND gate 116 whose output similarly passes through the OR gate 114 which is the other situation which would activate MODE LATCH 2. The output of TIMING LATCH 20 on FIG. 7 which is set similarly by the occurrence of a light pen detect is applied through OR gate 118 to reset the TRACKING OPERATION LATCH. The setting of TL20, as will be seen by examining the circuitry of FIG. 7, removes the top input from AND gate 120 and thus prevents the further advance of the TIMING RING, thus, inhibiting further generation of the tracking pattern. The setting of TL20 essentially initiates the following actions. The first is the gating of the proper addresses correction from the instruction list shown in FIG 5 under control of the current setting of the TIMING RING and also gating the current address in the CRT DISPLAY BUFFER REGISTERS so that the new ORIGIN ADDRESS may be generated. The setting of this latch subsequently causes the output of the ADDER to be gated to the ORIGIN ADDRESS REGISTERS (OAR). Subsequent to this operation, the system will become quiescent until it receives another STM pulse from the X decoder. However, in normal usage after each tracking pattern generation, the CRT DISPLAY would enter a display cycle to display the pattern so far generated by the light pen and detected by the system and subsequent to this display another tracking cycle would begin. This would of course assume continued activation of the light pen switch and the mode of pattern presentation would depend upon whether MODE LATCH 1 or MODE LATCH 2 were set.

Figure 9:
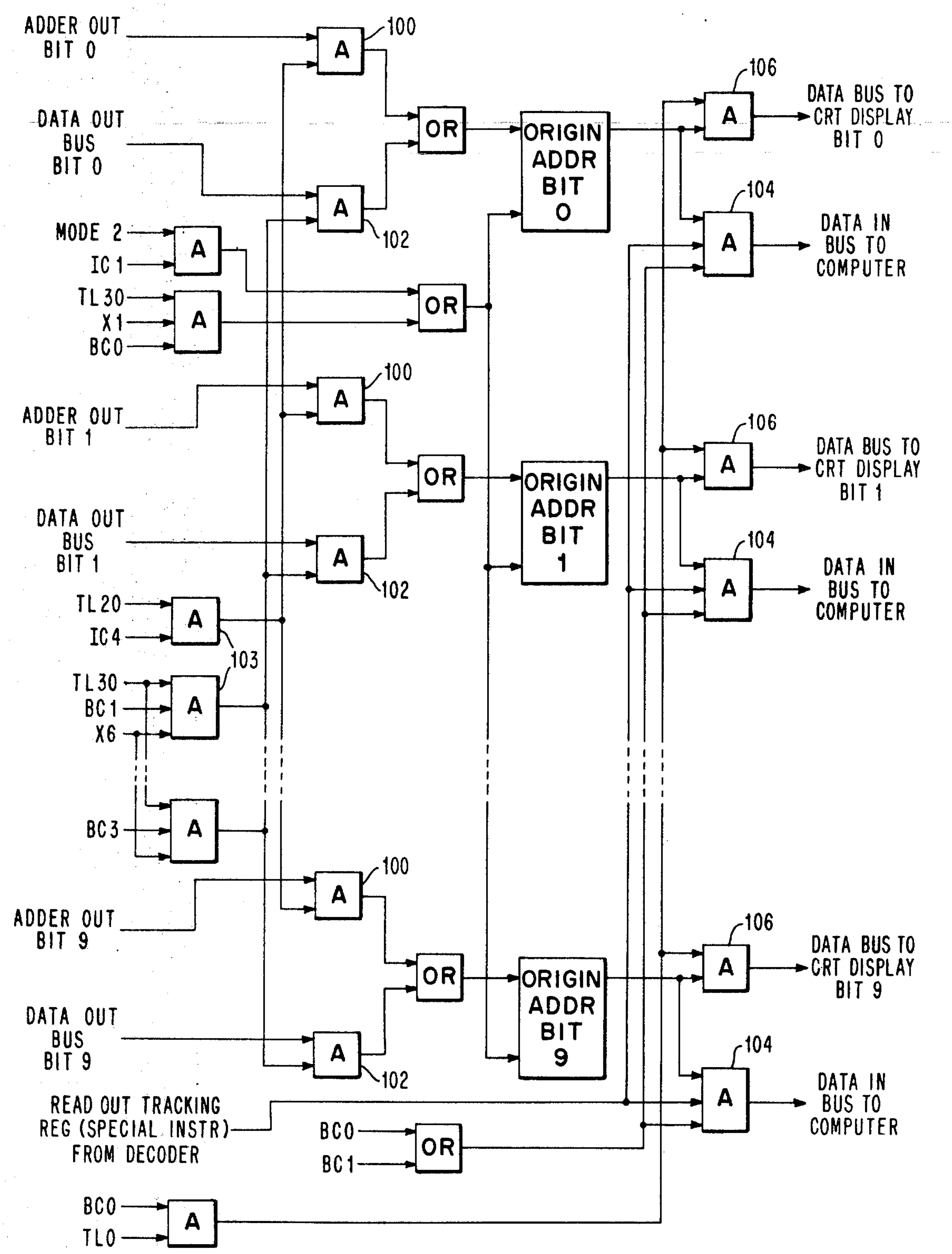
FIG. 9 comprises a logical block diagram of the X ORIGIN ADDRESS REGISTER.

FIG. 9 is a detailed logical schematic diagram of the X ORIGIN ADDRESS REGISTER showing the gating details set forth in a more general fashion in FIG. 6. In FIG. 9 AND gates 100 correspond to the single GATE 100 of FIG. 6, and gate 105 similarly corresponds to gate 105 in FIG. 6. AND gates 102 in FIG. 9 correspond to the single GATE 102 in FIG. 6 and the two gates 103 on FIG. 9 correspond to the single AND gate 103 on FIG. 6. It will be noted in FIG. 9 that the pulses BC1 and BC3 are applied to the different AND gates 103. This is merely a timing expedient with the particular system to which the present embodiment is attached. Only an eight-bit data bus is provided and since the address is 10 bits wide, it is broken into two five-bit pieces, i.e. 0—4 and 5—9 and transmitted sequentially over the eight-bit bus. If a 10-bit bus were provided, the entire address could be sent in a single time cycle as will be readily understood. AND gates 104 on FIG. 9 correspond to the single GATE 104 on FIG. 6 which is activated by the simultaneous occurrence of a READOUT TRACKING REGISTER signal which is a special signal provided by the system program and the occurrence of either timing pulse BC0 or BC1. The function of these gates is to gate the contents of the OAR to the computer when desired to build up the table of tracking addresses as they are generated by the instant tracking system. AND gates 106 on FIG. 9 correspond to the single gate 106 on FIG. 6 which are in turn activated by the simultaneous occurrence of pulse TL0 and BC0. The function of this gate, as is evident, is to gate the contents of the OAR to the CRT DISPLAY when it is desired to initiate the LONG ABSOLUTE STROKE and thus initiate the tracking pattern at this specified origin.

Figure 10:
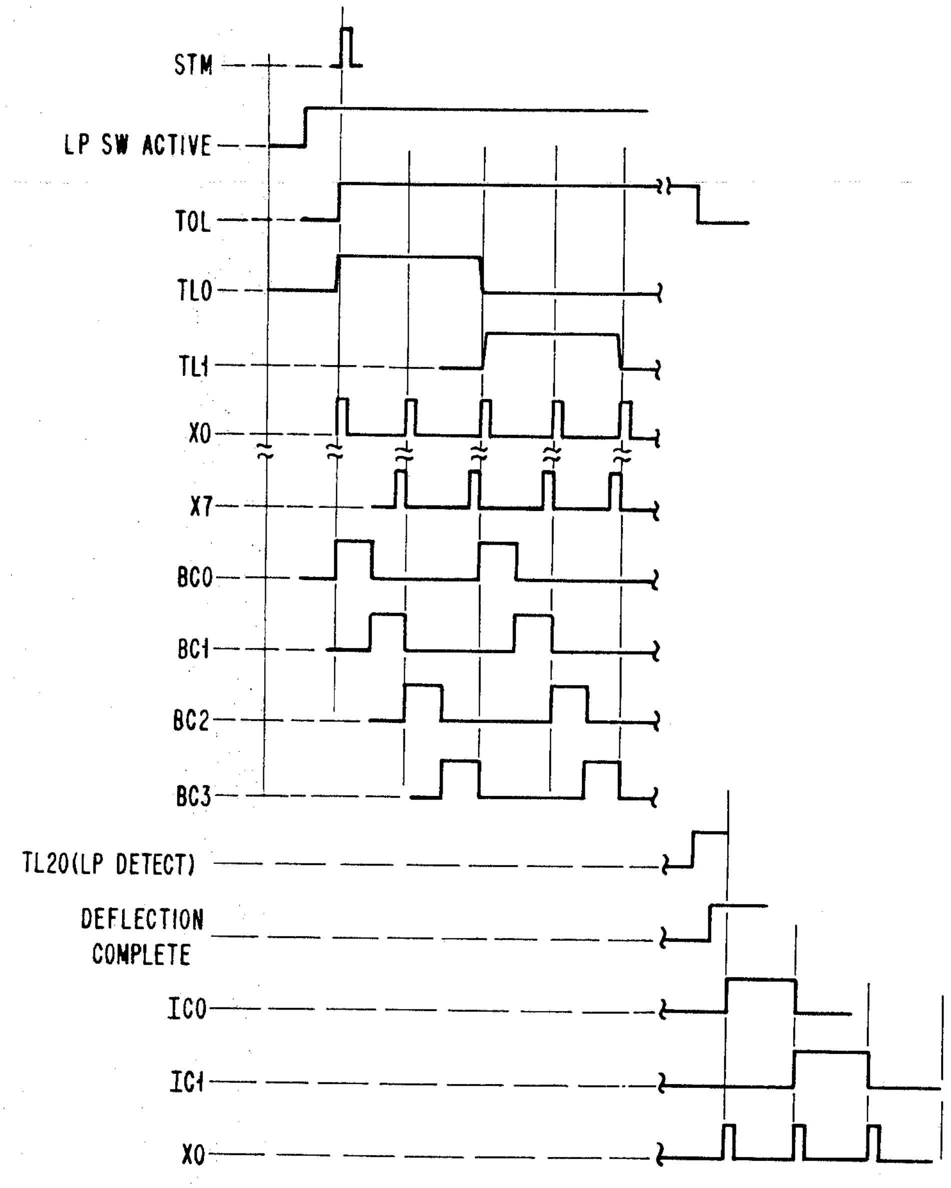
FIG. 10 comprises a timing chart for the basic timing pulses utilized by the present light pen tracking system.

FIG. 10 comprises a timing chart for the present system and illustrates the relative times of occurrence of the various timing pulses disclosed in the present embodiment. As stated previously, the timing sequences shown could be considerably simplified with a single timing clock, however, they are disclosed in the present form since the system has been adapted to operate with an IBM 1130 computer and an IBM 2250 CRT DISPLAY UNIT and the utilization of these basic system clocks, i.e., X CLOCK, BYTE COUNTER, INTERRUPT COUNTER, etc. assures synchronization of the various operations such as address and instruction transfer between the various units to assure proper overall system operation.

Referring specifically to the FIG., the first curve entitled LPSW ACTIVE may occur at any time and is not necessarily related to the machine cycle as this is merely a hand-operated switch under control of the operator.

The pulse labeled STM is the master start pulse derived from the basic system clock in the computer of the CRT DISPLAY. This pulse ANDed with the LPSW ACTIVE pulse, initiates the present system as will be seen from the curve marked TL0. It will be further noted that the X CLOCK pulses denoted X0—X7 and the BYTE COUNTER PULSES denoted BC0, BC1, BC2 and BC3 are all synchronized with the STM pulse. Similarly, the INTERRUPT COUNTER PULSES, IC0 and IC1, are synchronized with the X CLOCK pulses. It will also be noted that the LP DETECT and the DEFLECTION COMPLETE Signal may occur at any random time but that the ORIGIN UPDATE OPERATION does not begin until the INTERRUPT COUNTER turns on. And, specifically, the updating operation occurs during time sequence IC4 which allows adequate time for the ADDER to complete its operation and gate the proper address into the OAR's.

It will be noted that in the above description of FIGS. 1—10 not all of the functional and logical blocks were specifically discussed as it is believed that their function is clearly obvious either from the labelling of the blocks indicating the functional nature thereof and the various inputs and outputs which are also clearly labeled. To specifically recite every functional element would merely obfuscate the invention.

The overall operation of the present tracking control system will be briefly recapitulated to illustrate the basic tracking control sequences anticipated by the present invention. It will be noted that the MODE LATCH 1 and MODE LATCH 2 are reset to their off position at any time that the light pen tip switch is not being pressed against the face of the CRT. In this situation the tracking control unit is in a quiescent state and no tracking pattern is displayed. Whenever the operator desires the use of the light pen, he must press the pen against the CRT to close the switch or conversely could throw a manual switch if provided. At the time the next basic system clock synch pulse, i.e., the STM pulse is encountered in the system, the MODE LATCH 2 will be turned on. This will cause the tracking controls to try to display the complete four-box pattern. If all four boxes are displayed and no light pen detect occurs, the MODE LATCH 2 will be turned off and MODE LATCH 1 turned on. As long as the light pen remains in use and no detects occur, the tracking controls will remain in the MODE 1 type of operation which means that only the smallest box of the pattern will be displayed. During MODE 1 OPERATION the pattern is always drawn from the same ORIGIN ADDRESS, as this can only be changed during MODE 2 OPERATION. As a convenience of operation, the programmer may specify the initial ORIGIN ADDRESS which allows the tracking pattern to begin at some specified location on the face of the CRT. This instruction may be activated by a special computer instruction which would be interpreted by the DECODER which will cause the activation of the TIMING LATCHES 30 and 31 on FIG. 7.

If during the MODE 1 OPERATION a light pen detect signal is generated by one of the sides of the small box, MODE 2 OPERATION will begin by the turn on of the MODE LATCH 2. An attempt will be made to draw the whole pattern, but only as many lines will be completed as are needed until a light pen detect signal is encountered. The pattern origin will be repositioned and another MODE 2 OPERATION begun after the occurrence of the next master timing pulse STM. The MODE 2 OPERATION will continue as long as successive light pen detects occur. If no further detects occur, the system will revert to MODE 1 OPERATION and the static phase of the tracking operation is entered. This is distinguished from the active phase, MODE 2, when the moving light pen is actively being pursued. The TRACKING OPERATION LATCH shown on FIG. 8 is the basic control block which gates the signals from the incremental instruction list needed to draw the tracking pattern. When a detect occurs, the pattern drawing is terminated, the TRACKING OPERATION LATCH is deactivated and TIMING LATCH 20 is activated to provide the requisite ORIGIN ADDRESS updating.

As is apparent in order for the machine operator to know where the tracking pattern is located and thus the sequence of locations generated by the tracking pattern instructions may readily be provided which will cause the contents of the X and Y ORIGIN ADDRESS REGISTERS to be read out to the computer each time the ORIGIN ADDRESS is changed after a light pen detect. This operation may readily be obtained by using appropriate computer interrupt signals to condition the computer to accept these addresses. The actual gating controls, i.e. AND gates 104 on FIG. 9 are illustrated for the purpose of gating this address data to the computer.

There has thus been disclosed and described the essential features of a hardware embodiment of the present light pen tracking system sufficient to allow one skilled in the art to adapt the invention to any conventional computer-CRT DISPLAY system equipped with a light pen. The basic hardware necessary for switching from MODE 2 OPERATION to MODE 1 OPERATION is clearly described as well as a means for again going to MODE 2 OPERATION upon a light pen detect. It should clearly be understood, however, that the particular embodiment is somewhat simplified for purposes of explanation and that a more complex tracking pattern other than squares may be used in order to obtain a more precise following of the light pen. However, the means for doing this is thought to be clearly obvious to one skilled in the art as the essential modifications would reside in the TIMING RING per se, and in the incremental stroke and correction instruction lists.

It will also be readily apparent that more than four concentric tracking patterns may be used to in effect enable the system to follow more rapid light pen movement. This modification would also require the obvious extension of both the incremental instruction list, the correction factor list and the TIMING RING.

It would also be obvious to make further modifications to obtain incremental adjustments of the pattern if for example a light pen detect occurred first on one and then on the opposite side of the inner square or box. In this case, it would indicate that the tracking pattern had moved either too far or too rapidly and in this instance it might be desirable to have a second correction list for making smaller adjustments to ultimately center the pattern around the light pen.

As stated previously, the use of the X-COUNTER, BYTE COUNTER, and the INTERRUPT COUNTER were chosen for the embodiment as these counters exist in essence in a typical computer and CRT DISPLAY such as the IBM 1130 computer and the IBM 2250 CRT DISPLAY UNIT. However, it would be obvious to one skilled in the art to construct a single clock for controlling the present tracking pattern generation system on a stand-alone basis.

While the invention has been particularly shown and described with reference to preferred embodiments thereof, it will be understood by those skilled in the art that various changes in form and details may be made therein without departing from the spirit and scope of the invention.

We claim:

1. In a CRT display device including means for deflecting the cathode ray beam in accordance with data supplied thereto to produce visible patterns on the face of the cathode ray tube, and a light pen attachment including means for indicating when the light pen is in use and means for indicating when the light pen has intersected a visible pattern on the face of the CRT tube, the improvement which comprises a light pen tracking system including:

means for establishing a first tracking pattern mode of operation producing a first tracking pattern under conditions of no detected light pen motion, means for establishing a second tracking pattern mode of operation different from the first mode producing a second tracking pattern when motion of the light pen is detected, and means for continuing operation of the second mode until the light pen intersects the pattern whereby the size of the second pattern will vary in accordance with the speed of motion of said light pen.

2. A CRT display system as set forth in claim 1 wherein said patterns are comprised of a plurality of line segments including means for optically sensing when the light pen intersects a particular line segment of the tracking pattern and for generating a light pen detect signal in accordance therewith, and means operative upon the occurrence of said detect signal for disabling further generating of the second pattern.

3. A CRT display system as set forth in claim 2 wherein said means for establishing the first tracking pattern includes means for generating and displaying at least one closed polygon on the face of said CRT display, and said means for establishing the second tracking pattern includes means for generating and displaying additional closed polygons substantially concentric to that generated by said last named means and wherein during a first mode of operation said tracking system displays only said first tracking pattern and during a second mode of operation displays both said first and second tracking patterns.

4. A CRT display system as set forth in claim 3 wherein both said first and second tracking patterns comprise regular closed polygons.

5. A CRT display system as set forth in claim 3 wherein the spacing between any two adjacent polygons of said tracking patterns is less than the field of view of the light pen.

6. A CRT display system as set forth in claim 3 wherein the polygons comprising the tracking pattern are constructed of successively generated straight line segments beginning at an origin point on the inner most polygon, means operable upon the occurrence of a light pen detect signal for deriving the coordinate addresses of the last-generated line segment and means for modifying said address in a predetermined manner for generating the coordinate addresses of the origin point for the next tracking pattern.

7. A CRT display system as set forth in claim 6 wherein the means for modifying the address in a predetermined fashion includes a list of address correction factors and means for determining the particular tracking pattern polygon and the particular line segment within said polygon which was detected by said light pen, said determination being affective to extract a particular member of said correction list and for gating same to said modifying means.

8. A CRT display system as set forth in claim 7 wherein the modifying means comprises an adder for modifying both the X and Y coordinates when required.

9. A CRT display system as set forth in claim 8 wherein said CRT display is generated by incrementally moving the cathode ray beam from a current X–Y coordinate to another X–Y coordinate supplied to the CRT display deflection circuitry, and wherein the pattern generation means sequentially supplies a list of deflection increments to said CRT display system to generate the desired first and second tracking patterns.

10. A CRT display system as set forth in claim 9 wherein the tracking system controls includes a basic timing circuit comprising a set of latches wherein the setting of successive latch positions causes the generation of successive line segments of said display pattern.

11. A CRT display system as set forth in claim 10 wherein said tracking pattern system includes first and second operating mode latches only one of which may be in an active state at any one time including means for activating the first operating mode latch upon completion of said second tracking pattern without the occurrence of a light pen detect signal and means for maintaining said first operating mode latch in its active state until a light pen detect signal is detected, means for activating said second operation mode latch upon initiation of the tracking pattern generation system or upon the occurrence of a light pen detect signal while said first operating mode latch is in its active state, and means for maintaining activation of said second operation mode latch as long as a light pen detect signal is received during the tracking pattern generation.